United States Patent [19]

Hinlein

[11] Patent Number: 4,912,583
[45] Date of Patent: Mar. 27, 1990

[54] CLAMP FOR MOUNTING HEAD-LOAD BEAM SLIDER ARM IN A DISK DRIVE

[75] Inventor: Sigmund Hinlein, Sudbury, Mass.

[73] Assignee: Digital Equipment Corporation, Maynard, Mass.

[21] Appl. No.: 171,964

[22] Filed: Mar. 23, 1988

[51] Int. Cl.[4] .......................... G11B 21/16; G11B 5/48
[52] U.S. Cl. ...................................... 360/104; 360/103
[58] Field of Search ........................ 360/103, 104–109, 360/97.01, 98.01, 98.04, 99.01, 99.08

[56] References Cited

U.S. PATENT DOCUMENTS

| 4,387,409 | 7/1983 | Otavsky et al. | 360/104 |
| 4,535,374 | 8/1985 | Anderson et al. | 360/103 |
| 4,605,979 | 8/1986 | Inoue et al. | 360/105 |
| 4,760,478 | 7/1988 | Pal et al. | 360/104 |

FOREIGN PATENT DOCUMENTS

| 0208280 | 7/1986 | European Pat. Off. | |
| 61-120327 | 6/1986 | Japan . | |
| 61-239460 | 10/1986 | Japan . | |
| 62-76079 | 4/1987 | Japan . | |
| 62-243172 | 10/1987 | Japan | 360/104 |

OTHER PUBLICATIONS

"Disk File Actuator" by Dickie et al IBM/TDB vol. 18, No. 10, Mar. 1976, pp. 3435–3436.
"Captive Mounting Screw for Magnetic Head Arm" by Hatch et al IBM/TDB vol. 13, No. 3, Aug. 1970, p. 703.
"Self-Aligning Suspension to Arm Attachment by Rivets" vol. 29, No. 1, Jun. 1986, pp. 256–257.

Primary Examiner—John H. Wolff
Attorney, Agent, or Firm—Fish & Richardson

[57] ABSTRACT

An assembly and method for mounting a head in a disk drive (such as a disk reader or servowriter), comprising a detachable load beam slider arm adapted to carry the head on a distal end thereof, an actuator arm, and a threaded clamp for releasably attaching the proximal end of the load beam slider arm to the actuator arm, the threaded clamp being adapted to remain attached to the actuator arm when the load beam slider arm is removed. Alternatively, the slamp is adapted to remain attached to the load beam slider arm when the load beam slider arm is removed. Thus, the head may easily be removed and/or replaced simply by removing the head and load beam slider arm as a unit from the actuator arm and replacing it with another head-load beam slider arm unit.

22 Claims, 5 Drawing Sheets

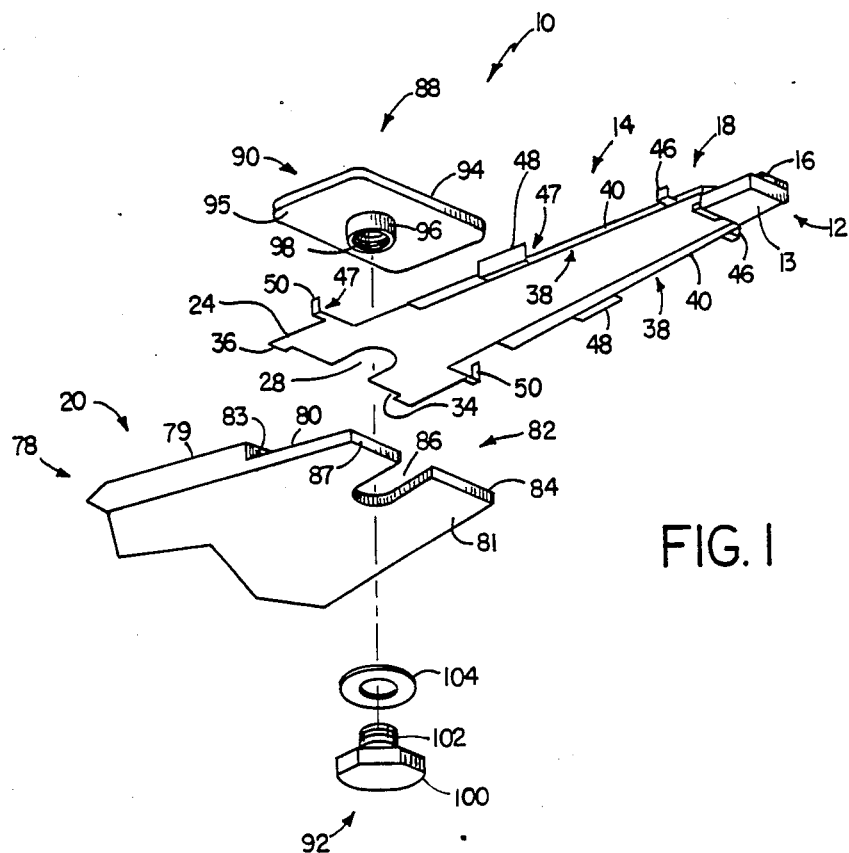
FIG. 1
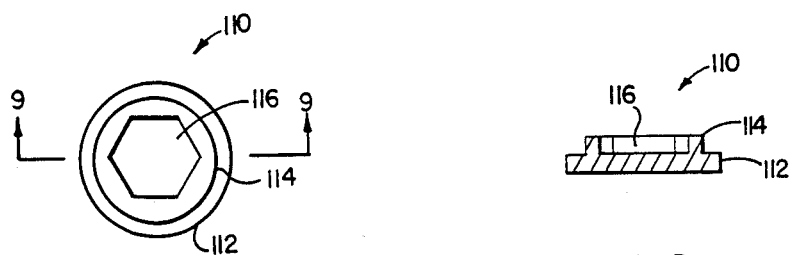
FIG. 8
FIG. 9

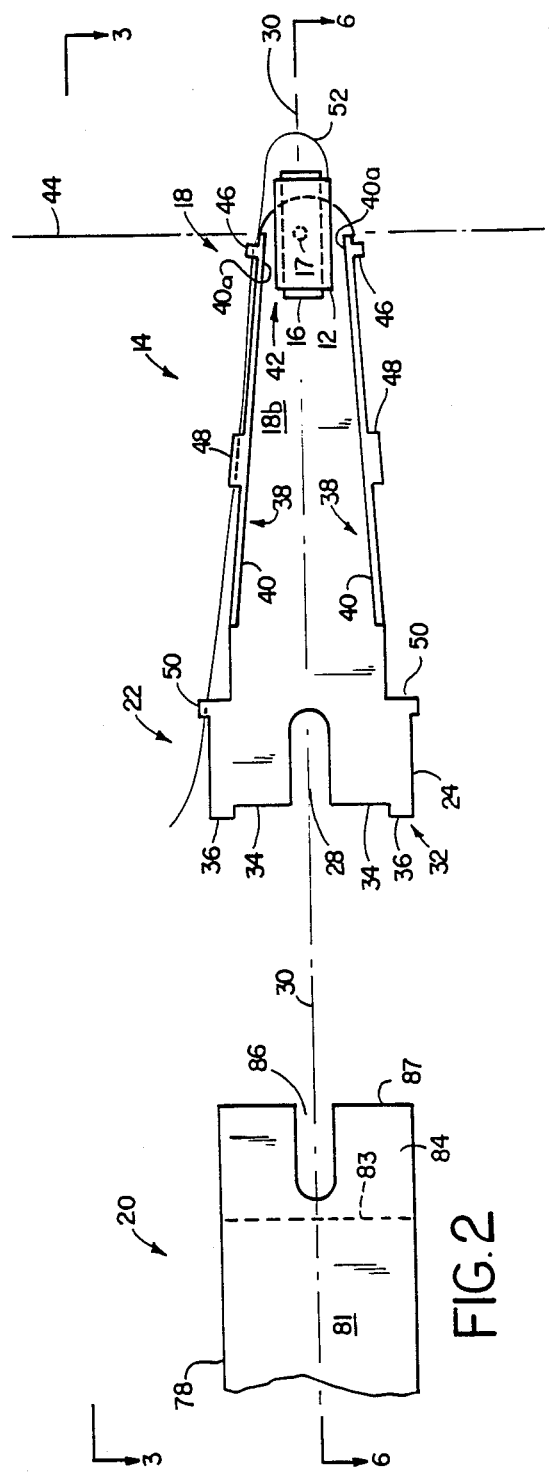

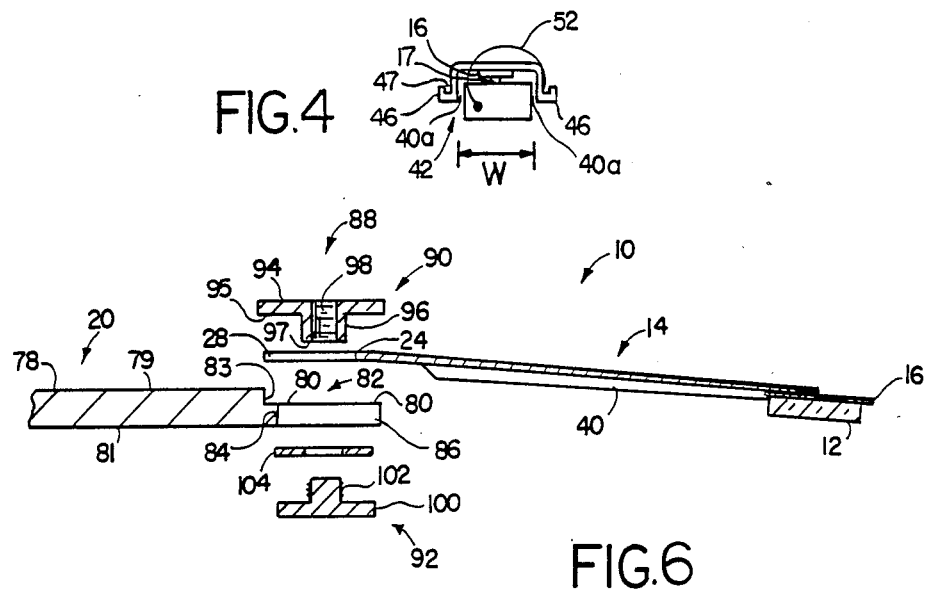
FIG. 4
FIG. 6
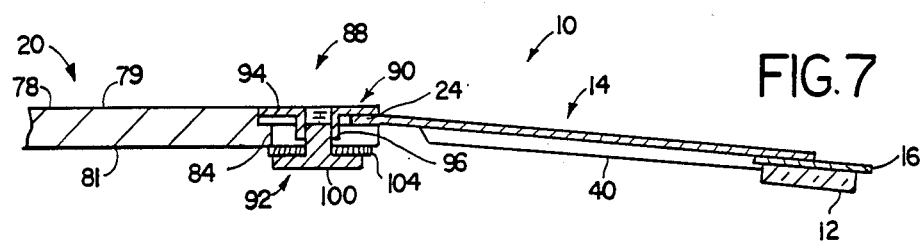
FIG. 7
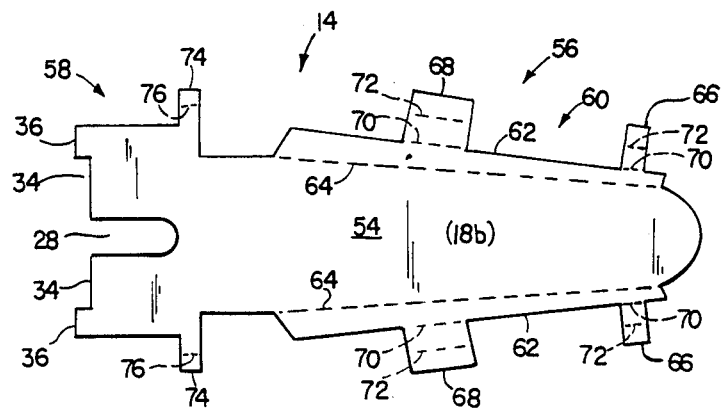
FIG. 5

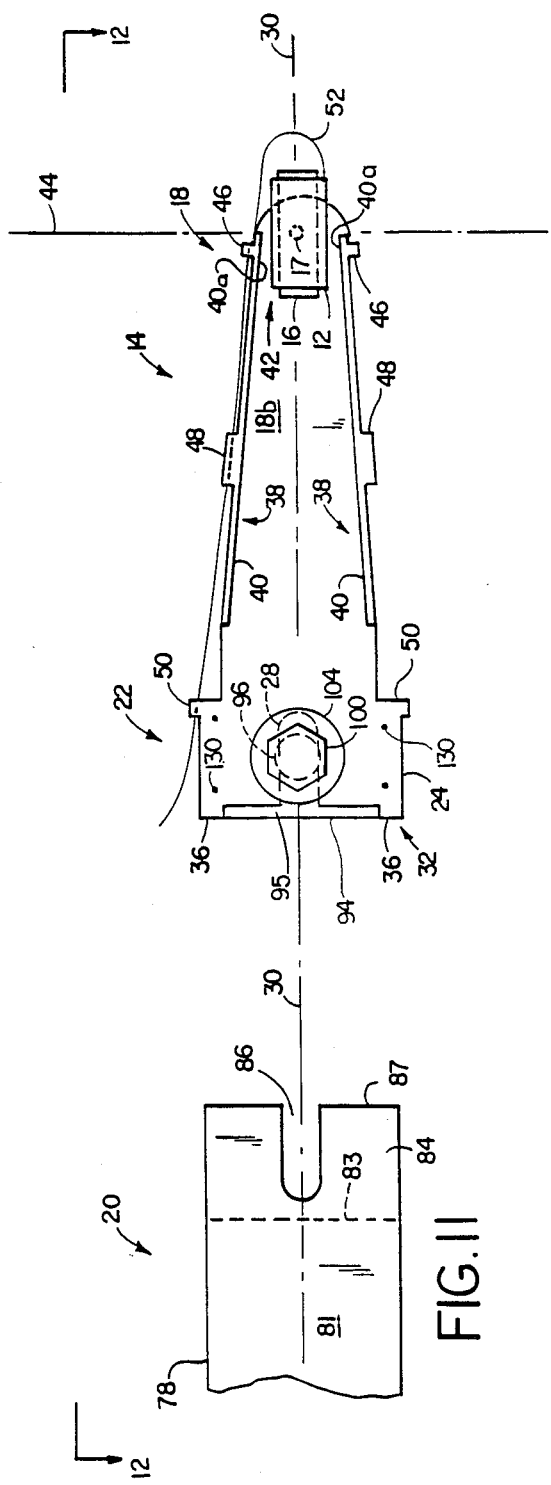
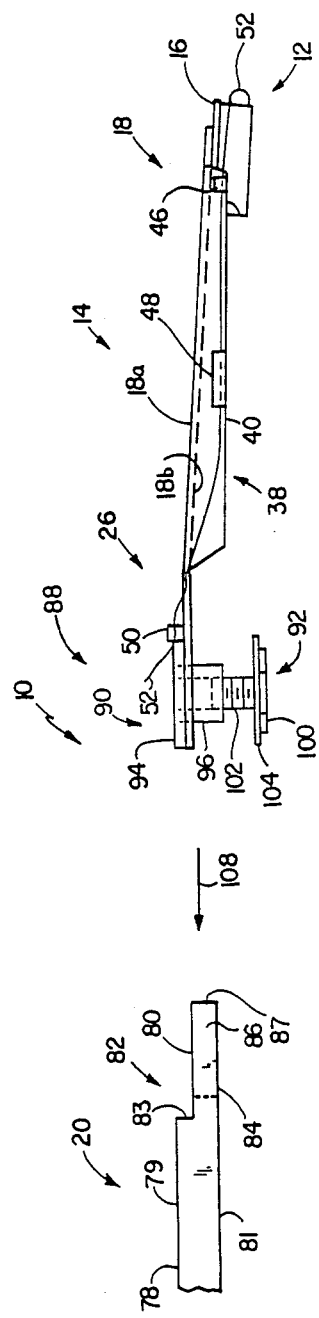
FIG.11
FIG.12

4,912,583

CLAMP FOR MOUNTING HEAD-LOAD BEAM SLIDER ARM IN A DISK DRIVE

BACKGROUND OF THE INVENTION

This invention relates to mounting load beam slider arms carrying heads in a disk drive, such as a disk reader or a servowriter.

As is known, in a disk drive, a head, such as a magnetic head, for reading data from or writing information onto the disk is typically mounted on one end of a load beam slider arm. The other end of the load beam slider arm is secured to an actuator arm, which is in turn coupled to the drive shaft of a motor, such as a servo or stepping motor. The head is moved to a selected track on the disk by the motor via the actuator and load beam slider arms.

One known way of securing the load beam slider arm to the actuator arm is by gluing the arms together. In a second method, known as "ball staking" the arms are attached by placing a hollow metal sleeve through aligned holes in the actuator and slider arms and expanding the sleeve by driving a ball bearing therethrough. Yet another method of securing the arms together is to mount the load beam slider arm to the actuator arm with one or more screws. The load beam slider arm is removed from the actuator arm by removing the screw or screws.

SUMMARY OF THE INVENTION

The invention features, in a first aspect, an assembly for mounting a head in a disk drive, comprising a detachable arm having a distal end adapted to carry the head, a mounting arm, and a threaded clamp attached to the mounting arm for releasably attaching a proximal end of the detachable arm to the mounting arm, the clamp being adapted to remain attached to the mounting arm when the detachable arm is removed.

Thus, the head may easily be remove and/or replaced simply by removing the head and detachable (i.e. load beam slider) arm as a unit from the mounting (i.e. actuator) arm and replacing it with another head-load beam slider arm unit. The entire mounting assembly need not be replaced as in prior mounting assemblies in which the load beam slider arm was permanently fastened to the actuator arm by gluing or "ball staking". Further, time consuming replacement of the load beam slider arm and head using special tools (as was required to gain access to and remove screws securing load beam slider arms to actuator arms in multiple disk assemblies) is eliminated, because the mounting assembly of the invention allows removal and replacement of the head simply by withdrawing the old head-load beam slider arm unit from the clamp and inserting a new one.

Preferred embodiments include the following features. The clamp comprises a plate coupled to a threaded member disposed through an opening in the mounting arm to releasably clamp the proximal end of the detachable arm between the plate and a mounting surface of the mounting arm. The mounting surface is recessed from a first surface along an edge to provide a cavity for receiving the proximal end and plate. The clamp and detachable arm include means for aligning the mounting arm and the detachable arm in predetermined axial alignment. Preferably, the axial alignment means comprises a proximal surface of the proximal end of the detachable arm which engages the edge of the cavity. The proximal end of the detachable arm has a predetermined width and comprises at least one finger terminating at the proximal surface and having a width less than the predetermined width. The clamp and detachable arm also comprise means for aligning the detachable arm and the mounting arm in predetermined lateral alignment. Preferably, the lateral alignment means comprises a slot, disposed in the proximal end of the detachable arm, adapted to engage the threaded member when the clamp releasably secures the detachable arm to the mounting arm to laterally align the detachable and mounting arms. In some embodiments, the clamp is adapted to releasably attach a proximal end of a second head-carrying arm to the mounting arm and the opening in the mounting arm comprises a slot open at a distal end of the mounting arm to allow the threaded member and plate to be attached as a unit to the distal end of the mounting arm.

In a second aspect, the invention features a disk drive comprising a pair of spaced disks, a pair of heads for communicating with the pair of disks, a pair of detachable head-supporting arms, each detachable arm having one of the pair of heads secured to a distal end thereof, a mounting arm for the pair of detachable arms, and a threaded clamp attached to the mounting arm for releasably attaching proximal ends of the pair of detachable arms to the mounting arm, the clamp being adapted to remain attached to the mounting arm when one or both of the detachable arms are removed.

With this arrangement, either of the heads may easily be removed and/or replaced by removing that head and the associated supporting (i.e. load beam slider) arm as a unit from the mounting (i.e. actuator) arm by disengaging the appropriate threaded clamp. Thus, unlike prior multiple disk assemblies in which one or more non-defective heads had to be removed to provide access to the load beam slider arm to which the defective head was attached (for example, by screws), the invention permits the defective head to be replaced as a unit with its load beam slider arm without having to remove any other head or load beam slider arm.

Preferred embodiments include the following features. The mounting arm has an opening which includes a slot open at a distal end thereof to allow the threaded member and plate of the clamp to be attached as a unit to the mounting arm. Each detachable arm comprises a slot disposed in the proximal end thereof to engage the threaded member and align the detachable arm and the mounting arm laterally along an axis. The detachable arm also comprises a proximal surface portion adapted to engage the cavity edge to axially align the detachable arm on the axis.

In a third aspect, the invention features an assembly for mounting a head in a disk drive, comprising a detachable arm having a distal end adapted to carry the head, a mounting arm, and a threaded clamp for releasably attaching a proximal end of the detachable arm to the mounting arm, the threaded clamp being secured to the proximal end of the detachable arm to remain attached to the detachable arm when the detachable arm is removed. This arrangement reduces the number of parts that need to be inserted onto the mounting (i.e., actuator) arm by allowing the clamp and the detachable (i.e., load beam slider) arm to be inserted as a unit onto the actuator arm in a single step.

Preferred embodiments include the following features. The clamp comprises a plate, secured to the proximal end of the detachable arm, and a threaded member for threadably engaging the plate, the threaded member being adapted to be disposed through an opening in the mounting arm to releasably clamp the plate to a mounting surface of the mounting arm. Preferably, the plate is secured to the detachable arm by one or more spot welds.

In a fourth aspect, the invention features a method of mounting and replacing a head attached to a distal end of a detachable arm in a disk drive, comprising the steps of threadably tightening a clamp attached to the mounting arm to attach a proximal end of the detachable arm to the mounting arm in a predetermined, fixed position within a mounting cavity, removing the detachable arm from the mounting arm by loosening the clamp and withdrawing the proximal end of the detachable arm from the mounting cavity while maintaining the clamp attached to the mounting arm, inserting the proximal end of a replacement detachable arm, carrying a respective head, into the mounting cavity on said mounting arm, and threadably tightening the clamp to attach the proximal end of the replacement arm in the predetermined fixed position within the mounting cavity.

In a preferred embodiment, clamping members of the clamp are preassembled and attached to the mounting arm by sliding the preassembled clapping members onto the mounting arm as a unit through a slot open at an end of the mounting arm.

A fifth aspect of the invention features an assembly for mounting a head in a disk drive, comprising: a detachable arm including a distal end region adapted to carry the head on a surface thereof and a pair of side regions longitudinally disposed along the arm, the side regions being angularly disposed with respect to the surface to form a channel with the surface for receiving the head; a mounting arm; and, a threaded clamp for releasably attaching a proximal end of the detachable arm to the mounting arm, the clamp being adapted to remain attached to either the mounting arm or the detachable arm when the detachable arm is removed.

Other features and advantages of the invention will be apparent from the following description, and from the claims.

DESCRIPTION OF THE PREFERRED EMBODIMENT DRAWINGS

We first briefly describe the drawings.

FIG. 1 is an exploded perspective view of the head mounting assembly of the invention.

FIG. 2 is a plan view of the underside of a load beam slider arm and actuator arm of the head mounting assembly of FIG. 1.

FIG. 3 is a side view of the load beam slider arm and actuator arm of FIG. 2 taken along line 3—3, and also of components of a clamp for securing the arms together.

FIG. 4 is a front view of the load beam slider arm of FIG. 3 taken along line 4—4.

FIG. 5 is a plan view of a metal sheet pattern useful in understanding the fabrication of the load beam slider arm of FIGS. 1-4.

FIG. 6 is an exploded cross-sectional view of the load beam slider arm and actuator arm of FIG. 2 taken along line 6—6, and also of the components of the clamp of FIG. 3.

FIG. 7 is a cross-sectional view of the head mounting assembly of FIG. 6 fully assembled.

FIG. 8 is a top view of a tool useful in assembling the head mounting assembly of FIGS. 1-7.

FIG. 9 is a cross-sectional view of the tool of FIG. 8 taken along line 9—9.

FIG. 11 is a plan view of the underside of a load beam slider arm and actuator arm according to another embodiment of the head mounting assembly of the invention.

FIG. 12 is a side view of the load beam slider arm and actuator arm of FIG. 11 taken along line 12—12.

STRUCTURE AND OPERATION

Figure 10:
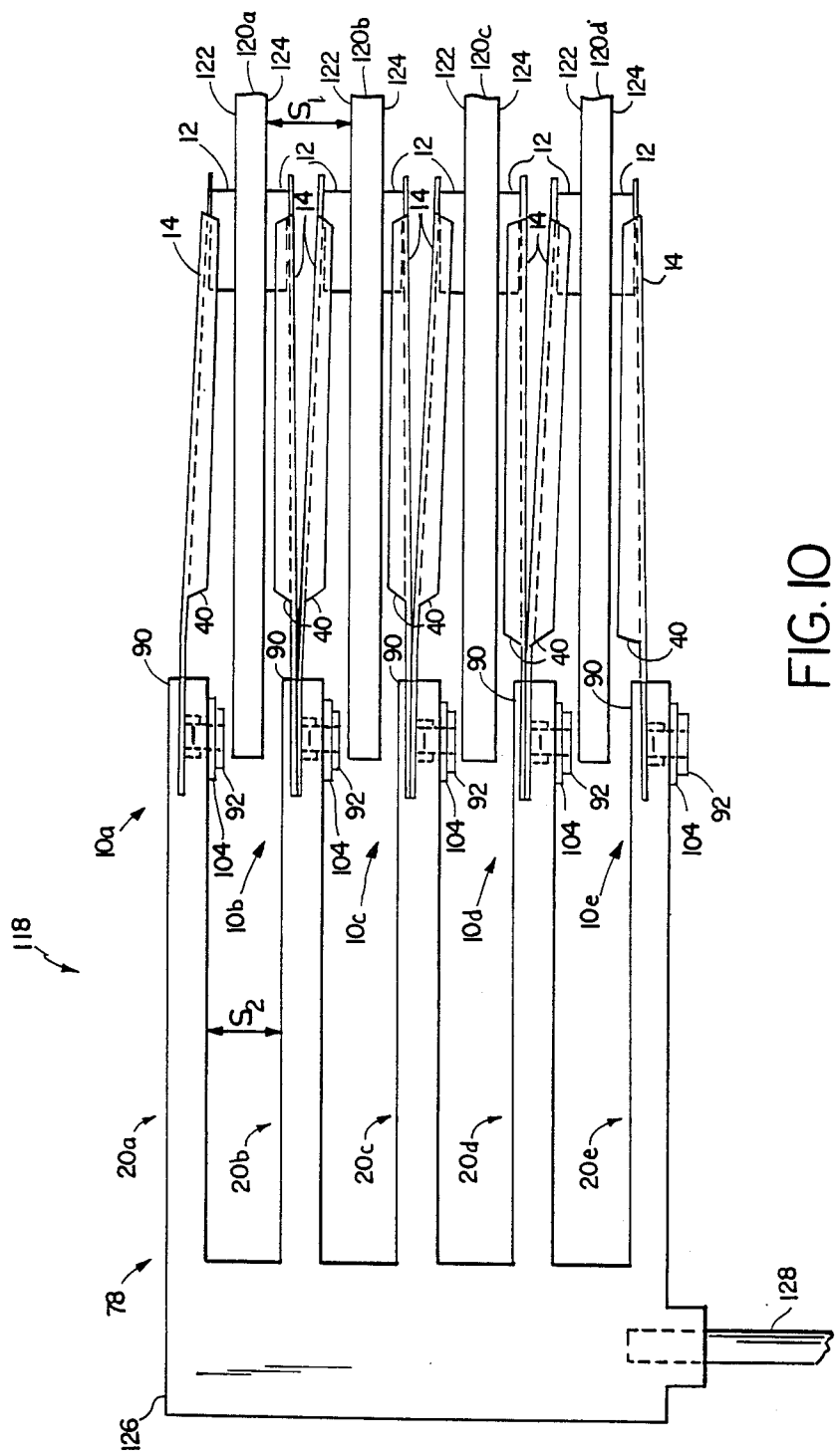
FIG. 10 is a side view of a multiple disk drive including a number of head mounting assemblies in accordance with FIGS. 1-7.

Referring to FIGS. 1-3, mounting assembly 10 for mounting magnetic head 12 within a disk drive (such as a disk reader or servowriter) comprises detachable load beam slider arm 14 for carrying and supporting magnetic head 12, which is in turn secured to slider 16 by gimbal mechanism 17. Magnetic head 12 is any suitable head for communicating with a magnetic disk (not shown) in a conventional manner, such as by writing mapping information onto the disk (as in a servowriter) or reading data from the disk (as in a disk reader). Slider 16 is fastened, for example, by epoxy, to distal end 18 of load beam slider arm 14. Actuator arm 20 supports and moves load beam slider arm 14 and head 12 among selected tracks on the magnetic disk in response to an actuator mechanism, such as a motor (not shown), for example, a servomotor or stepping motor.

Load beam slider arm 14 is a resilient metal (such as stainless steel) blade which is relatively thin (for example, 0.003 inches) to reduce its mass and allow a stream of air which passes between slider 16 and the disk during disk rotation to lift head 12 sufficiently to space underside 13 of head 12 from the disk surface. This protects head 12 from being damaged by the rapidly rotating (e.g., at 3000 rpm) disk during operation. Head 12 is disposed on lower surface 18b of distal end 18. Proximal end 22 of slider arm 14 forms base 24 disposed at a slight angle (for example, 1.5° to 2°) with respect to distal end 18 through bend region 26. This serves to "preload" head 12 into contact with the disk surface when the disk is at rest. Base 24 and bend region 26 are integrally formed with distal end 18 from a single piece of metal; thus, base 24 and bend region 26 are each also about 0.003 inches thick. Load beam slider arm 14 has a total length of about 1.15 inches.

Base 24 is approximately 0.2 inches in length and 0.4 inches wide. Mounting and alignment slot 28, approximately 0.1 inches wide, is disposed in base 24 laterally centered about longitudinal axis 30 of load beam slider arm 14. Slot 28 is approximately as long as base 24 and opens at proximal surface 32 thereof. A pair of shallower slots 34 are recessed from proximal surface 32 to form a pair of fingers 36, each about ⅛ of the width of base 24, at each side of base 24 for purposes discussed in detail below.

To stiffen load beam slider arm 14 and enable it to maintain its resiliency during repeated use in the disk drive (i.e., to prevent distal end 18 from being permanently bent away from the disk surface by the stream of air), a pair of stiffeners 38 are disposed longitudinally along distal end 18 between base 24 and the tip of distal end 18. Stiffeners 38 additionally inhibit twisting of load beam slider arm 14 about longitudinal axis 30. Stiffeners 38 preferably comprise a pair of side walls 40 integrally formed with the remainder of distal end 18. Side walls 40 are disposed at an angle (i.e., bent) with respect to upper and lower planar surfaces 18a, 18b, respectively, of distal end 18. More specifically, side walls 40 are bent downward (i.e., away from upper surface 18a and towards lower surface 18b) to be disposed on the same side of (i.e., beneath) distal end 18 as head 12. Stated alternately, side walls 40 make an angle of less than 180°, preferably approximately 90°, with lower surface 18b, while making an angle of greater than 180°, preferably about 270°, with lower surface 18b.

With this arrangement, head 12 and side walls 40 are positioned on the same side of lower surface 18b. The total height (i.e, the profile) $H_1$ (FIG. 3) of load beam slider arm 14 (including head 12) is reduced to approximately 0.0445 inches. The profile of load beam slider arm 14 itself below lower surface 18b ($H_2$) is only about 0.0355 inches. As discussed in detail below, the reduced profile of slider arm 14 permits the spacing between disks in a multiple disk drive to be concomitantly reduced.

Referring also to FIG. 2, distal portions 40a of side walls 40 straddle magnetic head 12, forming channel 42 with lower surface 18b within which head 12 is disposed. Thus, the minimum width, W, between distal side wall portions 40a is large enough (for example, 0.15 inches) to not only provide room for head 12 between side wall portions 40a but to also allow head 12 to move on gimbal 17 without contacting either distal side wall portion 40a. This increased width within channel 42 (i.e., in the region in which receives head 12) increases tee stiffness of distal end 18 with respect to axis 44 perpendicular to longitudinal axis 30. Thus, the positional stability of head 12 on longitudinal axis 30 is increased. This is especially important when load beam slider arm 14 is used with a rotary actuator in a "seek mode", in which actuator arm 20 rapidly pivots load beam slider arm 14 and head 12 along a tangental arc with respect to axis 44.

A pair of tabs 46, 48 are disposed on each side wall 40, and a pair o similar tabs 50 are disposed on the sides of base 24. As shown in FIG. 1 and 3, tabs 46, 48 form "U"-shaped channels 47 with the outer surfaces of side walls 40. Tabs 46, 48 provide restraints in channels 47 for electrical lead 52 connected to head 12 from circuitry in the disk drive. Electrical lead 52 is restrained against one of the side walls 40 simply by bending tabs 46, 48 of that side wall toward the wall with any suitable tool with lead 52 disposed in channels 47. Moreover, tabs 48, which are wider than tabs 46, provide a pair of "handles" for engagement by a slider arm mounting tool (not shown). This facilitates insertion and removal of load beam slider arm 14 on actuator arm 20 (in a manner described in detail below) while maintaining the mounting tool away from head 12 to avoid possible damage thereof by the mounting tool.

Referring also to FIG. 5, load beam slider arm 14 is fabricated by etching or stamping sheet 54 of stainless steel in pattern 56. Proximal end 58 of metal sheet 54 is stamped in the shape of base 24 and includes slots 28, 34. Distal end 60 includes a pair of flaired edges 62 which are spaced from line 64 by an amount corresponding to the height of each side wall 40. Such spacing varies from a maximum of 0.03 inches at proximal end 41 (FIG. 3) of side wall 40 to a minimum of 0.02 inches at distal end 40a. Each side wall 40 is formed simply by bending flaired edges 62 along line 64 upwards with respect to surface 18b until the desired angle with surface 18b (e.g., 90°) is reached. An angle of 90° provides the greatest stiffness, but the angle may alternately be either acute or obtuse as desired.

Each flaired edge 62 includes a pair of projections 66, 68 which are used to form tabs 46, 48, respectively. Each tab 46, 48 is formed (after edges 62 have been folded on line 64) by first bending each projection 66, 68 outward with respect to the associated side wall 40 along line 70 until the projection makes an angle of about 90° with side wall 40. Then, projections 66, 68 are bent downward with respect to associated side walls 40 along lines 72 to be approximately parallel thereto (see FIG. 1). Proximal end 58 includes a pair of projections 4 from which tabs 50 are formed simply by bending projections 74 downward 90° along line 76.

Referring also to FIGS. 6 and 7, actuator arm 20 has a relatively thick (e.g., about 0.05 inches) proximal end 78 and is fabricated from aluminum to reduce its mass while maintaining a high degree of stiffness. This is desirable because, as discussed, in some applications actuator arm 20 is rapidly moved during operation to position head 12 among various disk tracks. Upper surface 80 of the distal end of actuator arm 20 is recessed (for example, by grinding) from upper surface 79 of proximal end 78 to form slot-shaped cavity 82 in actuator arm 20. Cavity 82 extends the entire width of the distal end of actuator arm 20 and is also about as wide as load beam base 24, which cavity 82 receives. Cavity 82 terminates at edge 83 and has a length approximately equal to that of base 24. Cavity 82 is about 0.03 inches deep for purposes discussed in detail below.

The distal end of actuator arm 20 thus comprises shelf 84 of reduced thickness (about 0.02 inches thick) from proximal end 78 and formed integrally therewith. Mounting and alignment slot 86, approximately 0.1 inches wide, s disposed completely through shelf 84 and located at the lateral center thereof (i.e, slot 86 is centered about longitudinal axis 30 of actuator arm 20). Slot 86 opens at distal surface 87 of actuator arm 20 and extends approximately the entire length of shelf 84. Thus, with base 24 of load beam slider arm 14 inserted and laterally centered in cavity 82, portions of alignment and mounting slots 28, 86 of load beam slider arm 14 and actuator arm 20, respectively, are in registry.

Base 24 is secured to actuator arm shelf 84 by threaded clamp 88, which is shown disassembled in FIGS. 1 and 6 and partially assembled in FIG. 3. Clamp 88 comprises threaded nut plate 90, bolt 92, and also actuator arm shelf 84. Nut plate 90 includes rectangular stainless steel plate 94, approximately 0.02 inches in thickness, having about the same length and width dimensions as base 24. Generally circular throat 96 is disposed at approximately the lateral and longitudinal centers of plate 94 and protrudes about 0.018 inches from underside 95 of plate 94. The outer diameter of throat 96 is slightly less than 0.1 inches, enabling throat 96 to snugly fit within slots 28, 86. Throat 96 (and the portion of plate 94 from which throat 96 protrudes) includes threaded opening 98 for receiving bolt 92.

Bolt 92 is also stainless steel and comprises a thin, hexagonal-shaped, ⅛ inch head 100.(for example, 0.02 inches thick) and threaded stem 102, approximately 0.06 inches long, for engaging threaded opening 98 of nut plate 90 from underside 81 of shelf 84.

As shown in FIG. 3, mounting assembly 10 is assembled by first loosely assembling bolt 92 and nut plate 90. Preferably, stainless steel washer 104 (approximately 0.15 inches in diameter and 0.005 inches thick) is used with bolt 92 for purposes to be explained. Washer 104 is placed on bolt 92 and stem 102 turned a short distance into threaded portion 98 of nut plate 90. Nut plate 90, bolt 92, and washer 104 are then inserted onto shelf 84 as a unit by sliding nut plate throat 96 into slot 86 in the direction of arrow 106 so that bolt 92 and washer 104 are disposed below shelf 84 and nut plate 90 is located above shelf 84. Because bolt 92 is only slightly threaded into nut plate 90, underside 95 of plate 94 will only loosely engage upper surface 80 of shelf 84 at this stage.

Then, load beam slider arm 14 is inserted on actuator arm 20 by inserting fingers 36 of base 24 between plate 94 and shelf 84, aligning slot 28 with throat 96, and sliding base 24 into actuator arm cavity 82 in the direction of arrow 108. Because slots 28, 86 are disposed at the lateral centers of load beam slider arm 14 and actuator arm 20, respectively, load beam slider arm 14 (and thus head 12) is laterally aligned with actuator arm 20 on longitudinal axis 30 when slot 28 is inserted about throat 96. Load beam slider arm 14 (and hence head 12) is axially aligned on longitudinal axis 30 by the engagement of fingers 36 with edge 83 of cavity 82. Slots 34 minimize the width of proximal surface 32 of base 24 that abuts cavity edge 83 and thus helps in squaring base 24 within cavity 82.

Referring also to FIGS. 8 and 9, while holding load beam slider arm 14 in place within cavity 82 (for example, by a mounting tool which engages tabs 48), bolt 92 is fully tightened into nut plate 90. As discussed in detail below, in multiple disk drives, multiple actuator arms 20 for the several heads are spaced as narrowly as possible. Thus, circular wrench 110 is used to tighten bolt 92 into nut plate 90. Wrench 110 comprises hardened tool steel and is about 0.9 inches in diameter. Wrench 110 is about 0.06 inches thick and includes base 112 on which raised shoulder 114 is disposed. One-eighth inch, hexagonal shaped socket 116 is disposed in shoulder 114 and is slightly deeper than the thickness (0.02 inches) of bolt head 100. Wrench 110 is operated manually by placing it beneath actuator arm shelf 84, engaging bolt head 100 with socket 116, and turning wrench 110 to finger-tighten bolt 92 into threaded opening 98. The diameter of wrench 110 is larger than the width (0.4 inches) of shelf 84, thereby facilitating operation. Washer 104 prevents bolt head 100 from digging into underside 81 of shelf 84 (which would produce metal flakes which might damage the disk drive) and into the sides of slot 86.

With bolt 92 fully tightened into nut plate 90, load beam slider arm base 24 is securely clamped to shelf 84 (i.e., between underside 95 of plate 94 and shelf upper surface 80). Thus, clamp 88 overcomes the torque exerted on load beam slider arm 14 during operation (i.e., the forces exerted by the disk rotation-induced air stream and by rapid repositioning of head 12 by the actuator mechanism), thereby securely maintaining the lateral and axial alignment of head 12 and load beam slider arm 14 on longitudinal axis 30. Electrical lead 52 is restrained between one of tabs 50 and nut plate 90 simply by bending tab 50 toward plate 94 with lead 52 disposed in channel 47.

Load beam slider arm 14 is easily removed from actuator arm 20 for replacement or repair simply by engaging bolt head 100 with wrench 110 and slightly backing off (i.e., loosening) bolt 92 just enough (e.g., ¼ to ½ of a turn) to allow base 24 to be slid outward (i.e., in the opposite direction from arrow 108) from between nut plate 90 and shelf 84, and removing beam slider arm 14 from cavity 82 while keeping bolt 92 attached to nut plate 90 and maintaining throat 96 within shelf slot 86. That is, nut plate 90, bolt 92 and washer 104 remain assembled and attached to shelf 84. Another load beam slider arm 14 (carrying a new or repaired head 12) is then secured to actuator arm 20 following the above-discussed procedure.

Referring to FIG. 10, a section of a multiple disk drive 118 comprising four magnetic disks 120a–120d and five mounting assemblies 10a–10e is shown. Mounting assembly 10a is identical to mounting assembly 10 of FIGS. 1–7, as is mounting assembly 10e, except that its load beam slider arm 14 faces in the opposite direction than that shown in FIGS. 1–7 (i.e., upward rather than downward). Thus, head 12 of mounting assembly 10e communicates with lower surface 124 of disk 120d, while had 12 of mounting assembly 10a communicates with upper surface 122 of disk 120a. Mounting assemblies 10b, 10c, 10d each include a pair of load beam slider arms 14, disposed back-to-back and spot welded together, carrying heads 12 for communicating with upper and lower surfaces 122, 124 of a pair of the disks. Bend region 26 (FIG. 1) of each load beam slider arm 14 is adjusted to place each head 12 in contact with its associated disk surface 122, 124 when disks 120a–120d are at rest.

In each mounting assembly 10a–10e, base (or bases) 24 of load beam slider arm (or arms) 14 is disposed in cavity 82 (FIG. 3) of a corresponding actuator arm 20a–20e. Bases 24 are releasably clamped in place by the engagement of bolt 92 with nut plate 90 in the manner described in detail above.

Preferably, actuator arms 20a–20e are fabricated as a unitary structure with proximal ends 78 thereof being integrally formed with base 126, which is rigidly connected to drive shaft 128 of a servomotor or stepping motor. Thus, as shaft 128 rotates, actuator arms 20a–20e correspondingly move heads 12 in unison across upper and lower surfaces 122, 124 of disks 120a–120d.

Adjacent disks 120a–120d (e.g., disks 120a, 120b) are separated by $S_1$, which is a function of the profile (i.e., height) of the pair of load beam slider arms 14 disposed therebetween. With the low-profile (i.e., approximately 0.0445 total height) of load beam slider arms 164, spacing $S_1$ between lower surface 124 of disk 120a and disk 120b upper surface 122 is substantially reduced (for example, to 0.125 inches). This reduced spacing still provides sufficient room for each one of the pair of load beam slider arms 14 to be lifted off respective disk surfaces 122, 124 during operation without interference from the other. With disk spacing $S_1$ reduced, multiple disk drive 118 can be made smaller. Alternately stated, more disks can be accommodated in the same amount of space within disk drive 118.

Spacing $S_2$ between adjacent actuator arms 20a–20e is relatively small, for example, approximately 0.2 inches. Thus, slots 86 (FIG. 1) in shelf 84 of each actuator arm 20a–20e greatly facilitate the assembly of mounting assemblies 10a–10e by allowing nut plate 90, bolt 92, and associated washer 104 of each clamp 88 to be loosely preassembled and slid onto shelf 84 as a unit. While slots 86 could alternately be circular holes, this would require that each bolt 92 be passed through its associated shelf 84 before being inserted into nut plate 90, which would be difficult, given the small spacing, $S_2$, between adjacent actuator arms 20a–20e.

During operation of disk drive 118, if a magnetic head 12 (for example, one of the pair of heads secured to actuator arm 20c) fails, the head is easily replaced by removing head 12 and its associated load beam slider arm 14 as a unit from actuator arm 20c in the following manner. Base 126 is rotated so that actuator arms 20a–20e are pivoted to the peripheral edges of disks 120a–120d (after a conventional pivot stop has been removed), and a comb (not shown) is inserted between heads 12 disposed against upper and lower surfaces 122, 124 of disks 120a–120d. If the comb is not used, heads 12 will clap together (due to the resiliency of load beam slider arms 14) and be damaged when the assembly is pivoted away from the peripheral edges of the disks.

Defective head 12 is replaced simply by inserting wrench 110 (FIGS. 8, 9) beneath actuator arm 20c, engaging bolt head 100 (FIG. 7), and slightly loosening bolt 92 (for example, by ¼ to ½ of a turn). Wrench 110 easily fits between actuator arms 20c, 20d and operates easily to loosen bolt 92. Then, the load beam slider arm carrying the defective head is pulled out of clamp 88 (i.e., slid from between underside 95 of nut plate 90 and shelf surface 80 in the opposite direction of arrow 108 in FIG. 3) in the manner discussed above (after removing the electrical lead of head 12 from its connection in disk drive 118). The other load beam slider arm 14 mounted on actuator arm 20c is maintained between plate 94 and shelf 84. Then, a new head 12 and load beam slider arm 14 are inserted as a unit and clamped onto actuator arm 20c in the manner described above, again using wrench 110. The electrical lead of the new head 12 is then connected in disk drive 118. The multi arm assembly is pivoted to re-engage heads 12 with surfaces 122, 124 of disks 120a–120d and the comb is removed.

Other embodiments are within the scope of the following claims. For example, as discussed, shelf slot 86 in actuator arm 20 could alternatively be a circular hole. Of course, in this case clamp 88 could not simply be slidably inserted onto shelf 84. However, the circular hole would prevent clamp 88 from accidentally slipping off shelf 84 once the clamp is assembled.

Additionally, referring to FIGS. 11 and 12, threaded clamp 88 could alternatively be permanently attached to load beam base 24, such as by attaching underside 95 of nut plate 94 to the upper surface of load beam base 24 with a series of spot welds 130. Throat 96 protrudes through slot 28 (which could alternatively be a circular hole) in base 24, and threadably receives bolt 100. Mounting assembly 10 is assembled simply by sliding load beam slider arm 14 and partially assembled clamp 88 as a unit onto actuator arm shelf 84 in the direction of arrow 108, with throat 96 being inserted in actuator arm slot 86. Thus, nut plate 94 and base 24 are inserted as a unit into actuator arm cavity 92. Then, bolt 92 is tightened (preferably with wrench 110) in the manner discussed above. Disassembly follows the reverse of these steps.

The arrangement of FIGS. 11 and 12 reduces the number of parts that need be inserted onto actuator arm 20. That is, rather than initially inserting clamp 88 on shelf 84 and then sliding load beam slider arm 14 onto the shelf, load beam slider arm 14 and clamp 88 are inserted onto actuator ar 20 in one step.

What is claimed is:

1. An assembly for mounting a head in a disk drive, comprising
 a detachable arm having a distal end adapted to carry the head and a planar proximal end,
 a mounting arm that includes a planar mounting surface, and
 a threaded clamp having a planar clamping surface, said clamp being attached to the mounting arm for releasably gripping the proximal end of the detachable arm between said planar mounting surface and said planar clamping surface to secure said planar proximal end of the detachable arm to the mounting arm, said clamp being adapted to remain attached to the mounting arm when said detachable arm is removed.

2. The mounting assembly of claim 1 wherein said clamp comprises a plate coupled to a threaded member disposed through an opening in the mounting arm to releasably clamp the proximal end of the detachable arm between the plate and a mounting surface of the mounting arm.

3. The mounting assembly of claim 2 wherein said opening in the mounting arm comprises a slot open at a distal end of said mounting arm to allow said threaded member and plate to be attached as a unit to said distal end of the mounting arm.

4. The mounting assembly of claim 2 wherein the mounting surface is recessed from a first surface along an edge to provide a cavity for receiving said proximal end and plate.

5. The mounting assembly of claim 4 wherein said clamp and detachable arm include means for aligning said mounting arm and said detachable arm in predetermined axial alignment.

6. The mounting assembly of claim 5 wherein said axial alignment means comprises a proximal surface of said proximal end of the detachable arm for engaging the edge of said cavity.

7. The mounting assembly of claim 6 wherein said proximal end has a predetermined width and comprises at least one finger terminating at said proximal surface and having a width less than said predetermined width.

8. The mounting assembly of claim 2 wherein said clamp and detachable arm comprise means for aligning said detachable arm and said mounting arm in predetermined lateral alignment.

9. The mounting assembly of claim 8 wherein said lateral alignment means comprises a slot, disposed in said proximal end of said detachable arm, adapted to engage said threaded member when said clamp releasably secures the detachable arm to the mounting arm to laterally align said detachable and mounting arms.

10. The mounting assembly of claim 1 wherein said clamp is adapted to releasably attach a proximal end of a second head-carrying arm to said mounting arm.

11. A disk drive comprising
 a pair of spaced disks,
 a pair of heads for communicating with said pair of disks,
 a pair of detachable head-supporting arms, each detachable arm having one of the pair of heads secured to a distal end thereof and also having a planar proximal end,
 a mounting arm for said pair of detachable arms, said mounting arm including a planar mounting surface, and
 a threaded clamp having a planar clamping surface, said clamp being attached to said mounting arm for releasably gripping said planar proximal ends of said pair of detachable arms between said planar mounting surface and said planar clamping surface to secure said detachable arms to said mounting arm, said clamp being adapted to remain attached to the mounting arm when one or both of the detachable arms are removed.

12. The disk drive of claim 11 wherein said clamp comprises a plate coupled to a threaded member disposed through an opening in the mounting arm to releasably clamp said proximal ends between said plate and a mounting surface of the mounting arm.

13. The disk drive of claim 12 wherein the mounting surface is recessed from a first surface of said mounting arm along an edge to form a cavity within which said proximal ends and plate are disposed.

14. The disk drive of claim 13 wherein said opening in the mounting arm includes a slot open at a distal end of said mounting arm to allow said threaded member and plate to be attached as a unit to said mounting arm.

15. The disk drive of claim 13 wherein each said detachable arm comprises a slot disposed in the proximal end thereof to engage said threaded member and align said detachable arm and said mounting arm laterally along an axis.

16. The disk drive of claim 15 wherein each detachable arm comprises a proximal surface portion adapted to engage said cavity edge to axially align said detachable arm on the axis.

17. A method of mounting and replacing a head attached to a distal end of a detachable arm in a disk drive, comprising the steps of
tightening a threaded clamp that includes a planar clamping surface and is attached to a mounting arm that includes a planar mounting surface to grip a planar proximal end of the detachable arm between said clamping surface and said mounting surface and thereby attach the detachable arm to the mounting arm in a predetermined, fixed position within a mounting cavity,
removing the detachable arm from the mounting arm by loosening the clamp and withdrawing the planar proximal end of the detachable arm from the mounting cavity while maintaining the clamp attached to the mounting arm,
inserting the proximal end of a replacement detachable arm, carrying a respective head, into the mounting cavity on said mounting arm, and
tightening the clamp to attach the proximal end of said replacement arm in the predetermined fixed position within the mounting cavity.

18. The method of claim 17 further comprising the steps of
preassembling clamping members of the clamp, and
attaching the preassembled clamping members to the mounting arm by sliding the preassembled clamping members onto the mounting arm as a unit through a slot open at an end of the mounting arm.

19. An assembly for mounting a head in a disk drive, comprising
a detachable arm having a distal end adapted to carry the head,
a mounting arm having a planar mounting surface, and
a threaded clamp having a planar clamping surface for releasably gripping a planar proximal end of the detachable arm between said planar mounting surface and said planar clamping surface to secure said detachable arm to the mounting arm, the threaded clamp being secured to the proximal end of the detachable arm to remain attached to the detachable arm when said detachable arm is removed.

20. The mounting assembly of claim 19 wherein said clamp comprises a plate, secured to the proximal end of the detachable arm, and a threaded member for threadably engaging the plate, said threaded member being adapted to be disposed through an opening in the mounting arm to releasably clamp said plate to a mounting surface of said mounting arm.

21. The mounting assembly of claim 20 wherein the plate is secured to the detachable arm by one or more spot welds.

22. An assembly for mounting a head in a disk drive, comprising
a detachable arm including a distal end region adapted to carry the head on a surface thereof, a planar proximal end, and a pair of side regions longitudinally disposed along the arm, the side regions being angularly disposed with respect to the surface to form a channel with the surface for receiving the head,
a mounting arm having a planar mounting surface, and
a threaded clamp having a planar clamping surface for releasably gripping the planar proximal end of the detachable arm between said planar mounting surface and said planar clamping surface to attach said detachable arm to the mounting arm, the clamp being adapted to remain attached to either the mounting arm of the detachable arm when the detachable arm is removed.

* * * * *

UNITED STATES PATENT AND TRADEMARK OFFICE
CERTIFICATE OF CORRECTION

PATENT NO. : 4,912,583

DATED : March 27, 1990

INVENTOR(S) : Sigmund Hinlein

It is certified that error appears in the above-identified patent and that said Letters Patent is hereby corrected as shown below:

Column 1, line 39, "remove" should be --removed--.

Column 5, line 20, "Fig. 2" should be --Fig. 4--.

Column 5, line 30, "tee" should be --the--.

Column 5, line 40, "o" should be --of--.

Column 6, line 14, "4" should be --74--.

Column 6, line 35, "s" should be --is--.

Column 8, line 16, "had" should be --head--.

Column 8, line 43, "164" should be --14--.

Column 9, line 61, "ar" should be --arm--.

Signed and Sealed this

Twenty-fifth Day of February, 1992

Attest:

HARRY F. MANBECK, JR.

*Attesting Officer*     *Commissioner of Patents and Trademarks*